United States Patent [19]

Gariboldi et al.

[11] Patent Number: 5,182,470

[45] Date of Patent: Jan. 26, 1993

[54] NEGATIVE OVERVOLTAGE PROTECTION CIRCUIT, IN PARTICULAR FOR OUTPUT STAGES

[75] Inventors: Roberto Gariboldi, Lacchiarella; Alberto Gola, Broni, both of Italy

[73] Assignee: SGS-Thomson Microelectronics S.r.l., Agrate Brianza, Italy

[21] Appl. No.: 593,430

[22] Filed: Oct. 5, 1990

[30] Foreign Application Priority Data

Oct. 9, 1989 [IT] Italy .................. 21966 A/89

[51] Int. Cl.$^5$ ............................................. H03K 3/01
[52] U.S. Cl. ............................. 307/296.4; 307/296.1; 307/491; 361/92
[58] Field of Search .............. 307/296.1–296.8, 307/303, 491; 330/250, 261; 361/90, 91, 92

[56] References Cited

U.S. PATENT DOCUMENTS

| | | | |
|---|---|---|---|
| 3,727,107 | 4/1973 | Fujie et al. | 307/296.4 |
| 3,805,090 | 4/1974 | Kaiser | 307/457 |
| 4,058,760 | 11/1977 | Ahmed | 330/250 |
| 4,322,634 | 3/1982 | Kaire et al. | 307/296.4 |
| 4,327,368 | 4/1982 | Uchida | 307/296.2 |
| 4,477,737 | 10/1984 | Ulmer et al. | 307/491 |
| 4,551,687 | 11/1985 | Lukens | 330/261 |
| 4,695,751 | 9/1987 | De La Plaza | 307/491 |
| 4,740,719 | 4/1988 | Taki | 307/457 |
| 4,804,861 | 2/1989 | Hollstein | 307/296.1 |
| 4,987,327 | 1/1991 | Fernandez et al. | 307/491 |
| 4,996,446 | 2/1991 | Nakada | 307/296.5 |

OTHER PUBLICATIONS

IEEE Standard Dictionary of Electrical and Electronic Terms; Jul. 20, 1984; pp. 615+984.

Primary Examiner—William L. Sikes
Assistant Examiner—Terry D. Cunningham
Attorney, Agent, or Firm—Guido Modiano; Albert Josif

[57] ABSTRACT

An output stage with a protection circuit against negative overvoltage at its output terminal, having a transistor with collector output and with the emitter connected to a reference voltage line; a diode for protection against negative overvoltages present on the output is arranged between the collector and the output of the stage. In order to give the output of the stage a presettable minimum voltage level, the reference voltage line is set to a preset voltage which differs from the ground voltage. For this purpose, the circuit comprises an operational amplifier in a voltage-follower configuration, the output whereof is connected to the reference voltage line, a diode which is connected between the ground and the non-inverting terminal of the operational amplifier, and a current source which is connected between the non-inverting input of the operational amplifier and a negative supply line.

11 Claims, 1 Drawing Sheet

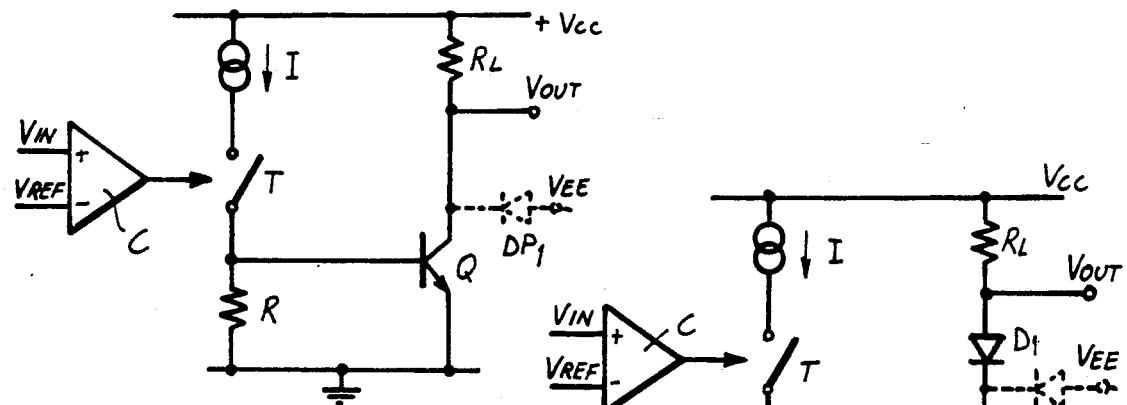
Fig.1 PRIOR ART
Fig.3 PRIOR ART
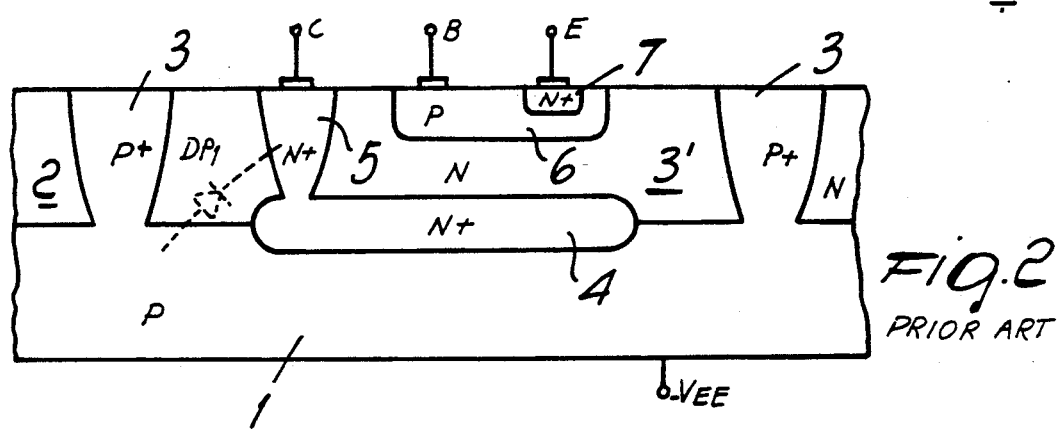
Fig.2 PRIOR ART
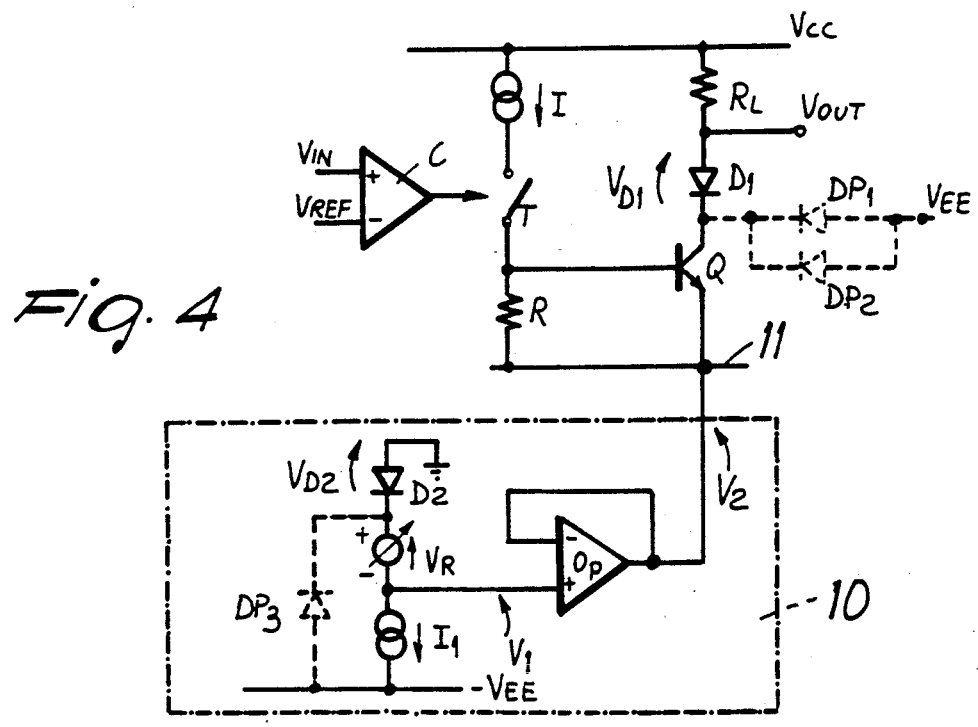
Fig.4

NEGATIVE OVERVOLTAGE PROTECTION CIRCUIT, IN PARTICULAR FOR OUTPUT STAGES

BACKGROUND OF THE INVENTION

The present invention relates to an output stage, such as a driving stage or a line driver for transmitting data on line, having a protection circuit against accidental negative overvoltage at the stage output and a reference voltage circuit.

A driving stage of the indicated type is schematically shown in FIG. 1, wherein Q indicates an output transistor, the collector whereof defines the output on which the voltage $V_{OUT}$ is present and the emitter whereof is connected to the ground. In detail, the stage comprises an input comparator C which has an inverting input connected to a reference voltage $V_{REF}$ and a non-inverting input to which a control voltage $V_{IN}$ is supplied. The output of the comparator C controls the open or closed state of a switch T which is connected on one side to a source of current I and on the other to the base of Q; a resistor R is furthermore provided between the base of Q and the ground, whereas a load resistor $R_L$ is provided between the collector of Q and the positive supply voltage $V_{CC}$.

Consequently, when the voltage $V_{IN}$ at the non-inverting terminal of the comparator C exceeds the value of the reference voltage $V_{REF}$, the switch T is closed, injecting the current I in the base of the transistor Q, which starts to conduct and saturates, so as to bring the output to a voltage which corresponds to a low logical state. Alternatively, when the voltage $V_{IN}$ is lower than the reference voltage, the switch T opens, Q is switched off and the output reaches the value of $V_{CC}$ due to the presence of $R_L$. Therefore the low output level is equal to the saturation voltage of the transistor with respect to the ground, whereas the high output level is equal to $V_{CC}$, as required by the specifications.

Though it operates satisfactorily in most cases, this known stage is subject to damage if a negative voltage which is higher, in absolute value, than the negative supply voltage $-V_{EE}$ (i.e. when $V_{OUT} < -V_{EE}$) is inadvertently applied to its output.

The output transistor Q is in fact an integrated bipolar transistor executed with junction insulation, as illustrated in the transverse sectional view of FIG. 2. In this figure, the reference numeral 1 indicates the P-type substrate, 2 indicates the epitaxial layer and 3 indicates the P+-type insulation ring which insulates the well 3', in which the transistor is integrated, from the other structures which are integrated in the same device. The reference numeral 4 indicates the N+-type buried layer and 5 indicates the N+-type sinker layer which forms, together with the well 3', the collector of the transistor. The P-type diffusion 6 defines the base, whereas the N+-type diffusion 7 forms the emitter of Q. The diffusions 5, 6 and 7 are connected to the collector contact C, to the base contact B and to the emitter contact E respectively. As pointed out in the figure in broken lines, the P-type substrate 1 forms, together with the collector structure 4, 5, a parasitic diode $DP_1$. Said diode is thus connected with its cathode to the collector of Q and with its anode to the negative supply voltage $-V_{EE}$ of the stage, since the substrate is connected to said voltage.

The parasitic diode $DP_1$ consequently starts to conduct when the voltage applied to the collector terminal is more negative than the voltage applied to the substrate (i.e., indeed, $V_{OUT} < -V_{EE}$), conducting a high current which compromises the integrity of the stage.

In order to solve this problem, the arrangement of a diode in series to the collector of Q, between said collector and the output, has already been proposed. This solution is shown by way of example in FIG. 3, wherein the protection diode has been indicated by $D_1$ and the rest of the structure is identical to FIG. 1. With this known solution, when a negative overvoltage is applied to the output terminal, the diode $D_1$ remains blocked and the current flows exclusively across $R_L$ and is limited thereby.

However, even this solution is not optimum, since the output voltage of the circuit in the low state becomes equal to the sum of the saturation voltage between the collector and the emitter of Q and the drop on $D_1$, i.e.:

$$V_{OUT,low} = V_{CEsat,Q} + V_{D1} \neq 0.1\ V + 0.7\ V = 0.8\ V.$$

This value is unacceptable, since the output voltage at the low level must never exceed 0.4 V, as required for the outputs of certain types of digital circuits such as for example TTL circuits.

The use of a Schottky diode with a typical $V_D$ of 250 mV would lead to a low output voltage of approximately 350 mV which would therefore be acceptable. The problem with this solution is that in the bipolar technology used for this stage Schottky diodes are not available.

Consequently, in a stage of the indicated type there is the problem of providing a protection which on one hand is capable of ensuring the integrity of the protected stage even when the output reaches a voltage which is lower than the negative power supply and on the other hand provides output voltage levels which are compatible with current specifications of digital circuits.

SUMMARY OF THE INVENTION

More generally, the aim of the present invention is to provide an output stage having a protection circuit against accidental negative overvoltage at its output terminal, such that the output terminal, when set to a "low" output voltage, does not exceed the low level as required for digital circuits.

Within the scope of this aim, a particular object of the present invention is to provide a protection circuit which can be completely integrated and does not require the use of external components.

Another object of the present invention is to provide a protection circuit by virtue of which the currents which circulate in the protected stage and in the protection circuit itself are limited.

Not least object of the present invention is to provide a protection circuit which is highly reliable and flexible.

This aim, the objects mentioned and others which will become apparent hereinafter are achieved by an output stage with a protection circuit, against negative overvoltage at its output terminal, as defined in the accompanying claims.

BRIEF DESCRIPTION OF THE DRAWINGS

The characteristics and advantages of the invention will become apparent from the description of a preferred embodiment, illustrated only by way of nonlimitative example in the accompanying drawings, wherein:

FIG. 1 is an electric diagram of a known output stage without protection;

FIG. 2 is a transverse sectional view taken across a chip of semiconductor material which integrates the output transistor Q of FIG. 1;

FIG. 3 is an electric diagram of the known output stage of FIG. 1 with overvoltage protection of a known type; and FIG. 4 is an electric diagram of the protection circuit according to the invention applied to the known output stage of FIG. 1.

DESCRIPTION OF THE PREFERRED EMBODIMENTS

FIGS. 1-3 are not described hereinafter; for these figures, reference is made to the preceding description.

According to the invention, in order to protect an output stage of the indicated type, with a transistor which has a collector output and is having its emitter connected to a reference voltage, a diode is inserted between the collector and the output of the stage, as in the known solution of FIG. 3, and the emitter of the output transistor is furthermore no longer connected to the ground of the integrated device comprising the output stage, but is connected to an appropriate voltage, in particular a negative one, the value of which is preferably equal to that of a drop across a diode.

An example of embodiment of the circuit suitable for generating the variable reference voltage according to the invention is illustrated in FIG. 4, wherein said circuit has been generally indicated by the reference numeral 10. The stage to be protected is, in the specific case, a line driving output stage of the type shown in FIGS. 1 and 3, and therefore the components of FIG. 4 which are in common with the known solutions have been given the same reference signs.

Therefore, with reference to FIG. 4; the output stage comprises the transistor Q, the collector whereof is connected, across the diode $D_1$, to the output of the stage, whereas its emitter is connected to the reference voltage, indicated here by $V_2$. This voltage is generated in output by the operational amplifier Op, which is connected as a voltage follower, i.e. with its inverting terminal connected to the output. The operational amplifier Op has the specific function of absorbing the current delivered by the transistor Q and by the source I. The non-inverting terminal of Op (on which the voltage $V_1$ is present) is connected (across the voltage source $V_R$) to the cathode of a diode $D_2$, the anode whereof is connected to the ground. The diode $D_2$ is physically executed like the diode $D_1$, so as to have in practice the same voltage drop across its terminals. A current source $I_1$ is furthermore connected between the non-inverting input of Op and the negative supply voltage $-V_{EE}$ and has the function of keeping $D_2$ conducting.

FIG. 4 also illustrates, in broken lines, the parasitic diodes which are the result of the integration of the stage and of the protection circuit in a silicon chip with junction insulation. Since the transistor Q is executed as shown in FIG. 2, the parasitic diode $DP_1$ is in fact associated therewith, whereas the parasitic diodes $DP_2$ and $DP_3$ are associated with the diodes $D_1$ and $D_2$, which are executed as base-collector diodes with a structure which is similar to that of FIG. 2 but in which the emitter diffusion 7 is not provided, whereas the diffusions 5 and 6 constitute the cathode and the anode respectively.

Ignoring the voltage source $V_R$ for the time being, the circuit of FIG. 4 operates as follows. Since the amplifier Op is voltage-follower connected, it output voltage is equal to the voltage on its non-inverting terminal and is therefore equal, in absolute value, to the drop across the diode $D_2$ ($V_{D2}$) which, as mentioned, is kept conducting by the source $I_1$. Therefore $$V_1 = V_2 = -V_{D2}.$$

Consequently, the high output voltage $V_{OUT}$ is still equal to $V_{CC}$, whereas the low output voltage, indicating the collector-emitter saturation voltage of Q with $V_{CEsat,Q}$ and indicating the drop across $D_1$ with $V_{D1}$, is equal to:

$$V_{OUT,sat} = V_2 + V_{CEsat,Q} + V_{D1} \simeq V_{CEsat,Q}$$

since $V_{D1}$ is equal to $V_{D2}$ in absolute value.

the presence of the parasitic diodes, in particular of $DP_1$ and of $DP_2$, produces no damage to the output stage even in the presence of negative overvoltages, since the diodes $DP_1$ and $DP_2$, associated with Q and with $D_1$, can never start conducting due to the presence of $D_1$. The output voltage in the low logical state is furthermore perfectly within the specifications.

The fact should furthermore be stressed that due to their structure the base-collector parasitic diodes have a high breakdown voltage (>50 V), so that the structure is completely reliable.

The voltage source $V_R$ offers an extension to what has been described above. In face it allows one to vary the referene voltage of the emitter of Q with respect to the ground according to the requirements. In particular, in the presence of $V_R$ the minimum output voltage is equal to:

$$V_{OUT,low} = -V_{D2} - V_R + V_{CEsat,Q} + V_{D1} \simeq V_{CEsat,Q} - V_R.$$

In practice, by inserting a voltage source in series to $D_2$ it is possible to make the output voltage in the low logical state assume any value according to the sign and value of $V_R$.

As can be seen from the above description, the invention achieves the intended aim and objects. A protection circuit has in fact been provided which on one hand ensures an excellent protection of the associated stage in the presence of overvoltages and on the other hand is compatible with the specifications of digital circuits. The described structure is furthermore easily integratable and no external components need to be added.

The fact is furthermore stressed that the reference voltage $V_2$ is available on the line 11, to which all the stages or devices which are present on the same integrated circuit and require said reference, in particular all the line driving devices, can be connected. This therefore allows providing a single circuit 10 for the entire integrated circuit even when a plurality of stages of the type shown in FIG. 1 is provided.

The circuit according to the invention is furthermore particularly flexible and adaptable to the various requirements, by virtue of the possibility of varying the reference voltage $V_2$ by means of the source $V_R$. Said source is in turn easily integratable.

The invention is furthermore circuitally simple and does not entail a large use of silicon area.

The invention thus conceived, besides the possibility of inserting the source $V_R$ or not, is susceptible to numerous modifications and variations, all of which are within the scope of the inventive concept.

All the details may furthermore be replaced with other technically equivalent ones.

We claim:

1. An output stage with a protection circuit against negative overvoltage at its output terminal, comprising:
   a negative overvoltage protection circuit having a first terminal connected to said output terminal of said stage and a second terminal;
   an output transister having a collector connected to said second terminal of said negative overvoltage protection circuit, a base and an emitter;
   control means connected to said base to actuate said output transistor between a substantially conducting state and a substantially nonconducting state;
   means interposed between a positive supply voltage line and said output terminal to bias said negative overvoltage protection circuit and said output transistor; and
   a voltage generating circuit, connected between said emitter and a ground reference line, comprising voltage source means, for generating a reference voltage the value whereof can be preset with respect to said ground reference line to substantially compensate for a voltage drop across said negative overvoltage protection circuit.

2. Output stage according to claim 1, wherein said negative overvoltage protection circuit comprises a first protection diode.

3. Output stage according to claim 2, wherein said output transistor is of the NPN type.

4. Output stage according to claim 2, wherein said first protection diode has its anode connected to said output terminal of said stage and its cathode connected to said collector of said output transistor.

5. Output stage according to claim 2, wherein said voltage source means furthermore comprises:
   an operational amplifier in a voltage-follower configuration, said operational amplifier having an output connected to said emitter of said transistor; an inverting input connected to its output; and a non-inverting input;
   a second diode having an anode connected to said ground reference line and a cathode;
   a voltage source means with a preset value which is connected between said cathode of said second diode and said non-inverting input of said operational amplifier; and
   a current source which is connected between said non-inverting input of said operational amplifier and a negative supply line of said stage.

6. Output stage according to claim 5, wherein said first protection diode and said second diode have substantially the same voltage drop across their respective terminals when active.

7. An output stage with a protection circuit against negative overvoltage at its output terminal, comprising:
   a negative overvoltage protection circuit including a first protection diode, said first diode having a first terminal connected to said output terminal of said stage and a second terminal;
   an output transistor having a collector connected to said second terminal of said first protection diode, a base and an emitter;
   control means connected to said base to actuate said output transistor between a substantially conducting state and a substantially nonconducting state;
   means interposed between a positive supply voltage line and said output terminal to bias said negative overvoltage protection circuit and said output transistor; and
   a voltage generating circuit, connected between said emitter and a group reference line, comprising voltage source means, for generating a reference voltage the value whereof can be preset with respect to a ground reference line to substantially compensate for a voltage drop across said negative overvoltage protection circuit, said voltage generating circuit including:
   an operational amplifier in a voltage-follower configuration, said operational amplifier having an output connected to said emitter of said output transistor; an inverting input connected to its output; and a non-inverting input;
   a second diode connected to said ground reference line;
   said voltage source means with a preset value which is connected between said second diode and said non-inverting input of said operational amplifier; and
   a current source which is connected between said non-inverting input of said operational amplifier and a negative supply line of said stage.

8. Output stage according to claim 7, wherein said first protection diode and said second diode have substantially the same voltage drop across their respective terminals when active.

9. Output stage according to claim 8, wherein said first protection diode has its anode connected to said output of said stage and its cathode connected to said collector of said output transistor.

10. Output stage according to claim 9, wherein said second diode has its anode connected to said ground reference line and its cathode connected to said voltage source means.

11. An output stage with a protection circuit against negative overvoltage at its output terminal, comprising:
   a negative overvoltage protection circuit including a first protection diode, said first diode having a first terminal connected to said output terminal of said stage and a second terminal;
   an output transistor having a collector connected to said second terminal of said first protection diode, a base and an emitter;
   control means connected to said base to actuate said output transistor between a substantially conducting state and a substantially nonconducting state;
   means interposed between a positive supply voltage line and said output terminal to bias said negative overvoltage protection circuit and said output transistor; and
   a voltage generating circuit, connected between said emitter and a ground reference line, comprising voltage source means, for generating a reference voltage the value whereof can be preset with respect to a ground reference line to substantially compensate for a voltage drop across said negative overvoltage protection circuit, said voltage generating circuit including:

an operational amplifier in a voltage-follower configuration, said operational amplifier having an output connected to said emitter of said output transistor; an inverting input connected to its output; and a non-inverting input;

a second diode connected to said ground reference line;

said voltage source means with a preset value which is connected between said second diode and said non-inverting input of said operational amplifier; and a current source which is connected between said non-inverting input of said operational amplifier and a negative supply line of said stage, wherein said first protection diode and said second diode have substantially the same voltage drop across their terminals when active.

* * * * *